(12) United States Patent
Watanabe et al.

(10) Patent No.: US 11,801,723 B2
(45) Date of Patent: Oct. 31, 2023

(54) SUSPENSION MOUNT

(71) Applicants: KURASHIKI KAKO CO., LTD., Kurashiki (JP); SUBARU CORPORATION, Tokyo (JP)

(72) Inventors: Yuya Watanabe, Kurashiki (JP); Naoki Miyamoto, Kurashiki (JP); Hiroo Kawano, Tokyo (JP)

(73) Assignees: KURASHIKI KAKO CO., LTD., Kurashiki (JP); SUBARU CORPORATION, Tokyo (JP)

( * ) Notice: Subject to any disclaimer, the term of this patent is extended or adjusted under 35 U.S.C. 154(b) by 160 days.

(21) Appl. No.: 17/491,303

(22) Filed: Sep. 30, 2021

(65) Prior Publication Data

US 2022/0105765 A1 Apr. 7, 2022

(30) Foreign Application Priority Data

Oct. 1, 2020 (JP) .................................. 2020-167095

(51) Int. Cl.
*B60G 13/00* (2006.01)
*B60K 5/12* (2006.01)
*F16F 9/54* (2006.01)

(52) U.S. Cl.
CPC .......... *B60G 13/003* (2013.01); *B60K 5/1208* (2013.01); *F16F 9/54* (2013.01);
(Continued)

(58) Field of Classification Search
CPC ............ B60G 13/003; B60G 2204/128; B60G 2204/40; B60G 2204/41; B60G 2204/43;
(Continued)

(56) References Cited

U.S. PATENT DOCUMENTS

| 6,199,844 B1 * | 3/2001 | McCormick ....... B60G 21/0551 267/221 |
| 7,938,418 B1 * | 5/2011 | Coombs ............... B60G 15/068 280/124.147 |

(Continued)

FOREIGN PATENT DOCUMENTS

JP  H04-51230 Y2  12/1992

*Primary Examiner* — Robert A. Siconolfi
*Assistant Examiner* — James K Hsiao
(74) *Attorney, Agent, or Firm* — Maschoff Brennan

(57) ABSTRACT

A strut mount includes: an inner member coupled to a suspension; an outer bracket having an outer cylinder portion housing the inner member, and a flange portion protruding radially outward from the outer cylinder portion and coupled to a vehicle body; an elastic member interposed between the inner member and the outer cylinder portion; and a seal member interposed between the flange portion and the vehicle body. The seal member includes an annular portion located between the flange portion and the vehicle body, and a first downward extending portion extending downward from an outer peripheral portion of the annular portion toward the opposite side from the vehicle body. The flange portion includes a placement surface portion which faces toward the vehicle body and on which the annular portion is placed, and a first sidewall portion extending from an outer peripheral portion of the placement surface portion to the opposite side from the vehicle body. A first engaging portion of the first downward extending portion and a first engaged portion of the first sidewall portion are engaged with each other to reduce axial movement of the annular portion placed on the placement surface portion.

4 Claims, 6 Drawing Sheets

(52) U.S. Cl.
CPC .... *B60G 2204/128* (2013.01); *B60G 2204/40* (2013.01); *B60G 2204/41* (2013.01)

(58) Field of Classification Search
CPC ............... B60G 2204/45; B60G 13/06; B60G 2202/143; B60G 2206/73; B60G 2206/82092; F16F 9/54; F16F 1/3863; F16F 1/3842; F16F 1/3732; B60K 12/08
See application file for complete search history.

(56) References Cited

U.S. PATENT DOCUMENTS

| | | | |
|---|---|---|---|
| 8,556,281 B2 * | 10/2013 | Lee ...................... | B60G 13/003 |
| | | | 280/124.147 |
| 10,421,346 B2 | 9/2019 | Ikawa et al. | |
| 2003/0127788 A1 * | 7/2003 | Graeve ................... | F16F 13/16 |
| | | | 267/219 |
| 2005/0155829 A1 * | 7/2005 | Germano ............ | B60G 15/068 |
| | | | 188/321.11 |
| 2006/0151928 A1 * | 7/2006 | Tamura ................ | B60G 13/003 |
| | | | 267/219 |
| 2008/0031562 A1 * | 2/2008 | Poulle ................... | B60G 11/15 |
| | | | 384/618 |
| 2011/0221158 A1 * | 9/2011 | Stautner ............... | B60G 15/068 |
| | | | 280/124.147 |
| 2020/0062062 A1 * | 2/2020 | Jeong ................... | B60G 15/067 |
| 2020/0164708 A1 * | 5/2020 | Lim ...................... | B60G 15/068 |
| 2020/0406515 A1 * | 12/2020 | Lim ...................... | B60G 15/04 |
| 2023/0128517 A1 * | 4/2023 | Shibata ................... | F16C 35/06 |
| | | | 280/124.155 |

\* cited by examiner

SUSPENSION MOUNT

CROSS-REFERENCE TO RELATED APPLICATION

This application claims priority to Japanese Patent Application No. 2020-167095 filed on Oct. 1, 2020, the entire disclosure of which is incorporated by reference herein.

BACKGROUND

The present disclosure relates to suspension mounts.

A suspension mount that is interposed between a vehicle body and a suspension is known in the art. For example, in an upper support for a suspension (suspension mount) disclosed in Japanese Examined Utility Model Publication No. H04-51230, an inner cylinder metal member and an outer cylinder metal member that are disposed at a predetermined distance in the radial direction are integrally connected by a rubber elastic material interposed between the inner and outer cylinder metal members. The outer cylinder metal member is fixed to the vehicle body by bolts at a plurality of positions in the circumferential direction in a flange portion of the outer cylinder metal member. At this time, the outer cylinder metal member is fixed to the vehicle body with one surface of the flange portion being in contact with the vehicle body. The suspension attached to the inner cylinder metal member is thus supported on the vehicle body in an anti-vibration manner.

A dust seal (seal member) is interposed between the flange portion of the outer cylinder metal member and the vehicle body in order to seal between the flange portion and the vehicle body. For example, the dust seal is bonded to the flange portion with an adhesive.

SUMMARY

In Japanese Examined Utility Model Publication No. H04-51230, the seal member is bonded and fixed to the flange portion by an adhesive in order to prevent the seal member from coming off from the flange portion due to, for example, separation of the seal member from the flange portion. In this fixing method, however, since the adhesive is solidified, the sealing properties of the seal member may be degraded.

The present disclosure was made in view of the above circumstances, and it is a primary object of the present disclosure to restrain a seal member interposed between a flange portion and a vehicle body from coming off from the flange portion in a suspension mount without using an adhesive.

A suspension mount according to the present disclosure is a suspension mount interposed between a vehicle body and a suspension. The suspension mount includes: an annular or cylindrical inner member coupled to the suspension; an outer bracket having an outer cylinder portion and a flange portion, the outer cylinder portion housing the inner member inside, and the flange portion protruding radially outward from the outer cylinder portion and coupled to the vehicle body; an elastic member interposed between the inner member and the outer cylinder portion; and a seal member interposed between the flange portion and the vehicle body. The seal member includes an annular portion located between the flange portion and the vehicle body, and a first downward extending portion extending downward from one peripheral portion of the annular portion toward an opposite side from the vehicle body, the one peripheral portion being either an outer peripheral portion or an inner peripheral portion. The flange portion includes a placement surface portion which faces toward the vehicle body and on which the annular portion is placed, and a first sidewall portion extending from the one peripheral portion of the placement surface portion toward the opposite side from the vehicle body so as to correspond to the first downward extending portion. The first downward extending portion has a first engaging portion, and the first sidewall portion has a first engaged portion. The first engaging portion and the first engaged portion are engaged with each other to reduce movement of the annular portion placed on the placement surface portion at least in an axial direction.

According to this configuration, when the annular portion of the seal member is placed on the placement surface portion of the flange portion, the first downward extending portion extending from the one peripheral portion of the annular portion toward the opposite side from the vehicle body faces the first sidewall portion extending from the one peripheral portion of the placement surface portion toward the opposite side from the vehicle body. In this state, the first engaging portion of the first downward extending portion and the first engaged portion of the first sidewall portion are engaged with each other. This engagement reduces movement of the annular portion placed on the placement surface portion at least in the axial direction.

This configuration restrains, without using an adhesive, the seal member from separating and coming off from the flange portion before the suspension mount is attached to the vehicle body.

According to one embodiment, the first engaging portion is a hole or a recess, and the first engaged portion is a protrusion.

According to this configuration, the structure is simple because the first engaging portion that is a hole or a recess and the first engaged portion that is a protrusion can be engaged with each other by merely fitting the first engaged portion in the first engaging portion.

In one embodiment, the annular portion has a second engaging portion, the placement surface portion has a second engaged portion corresponding to the second engaging portion, and the second engaging portion and the second engaged portion are engaged with each other.

According to this configuration, the second engaging portion of the annular portion and the second engaged portion of the placement surface portion are engaged with each other. This engagement restrains the annular portion placed on the placement surface portion from changing in shape in a radial direction or a circumferential direction. This engagement also restrains the annular portion from separating from the placement surface portion.

In one embodiment, the seal member has a second downward extending portion extending downward from the other peripheral portion of the annular portion toward the opposite side from the vehicle body, the other peripheral portion being either the outer peripheral portion or the inner peripheral portion, whichever is not the one peripheral portion, and the flange portion includes a second sidewall portion extending from the other peripheral portion of the placement surface portion toward the opposite side from the vehicle body so as to correspond to the second downward extending portion.

When the annular portion is placed on the placement surface portion, the first downward extending portion may be pressed by the first sidewall portion and the annular portion may be pulled toward the one peripheral portion side of the placement surface portion. In this case, the annular portion may be displaced with respect to the placement surface portion toward the one peripheral portion side, and the annular portion may become out of alignment from the other peripheral portion side of the placement surface portion. This is not preferable in terms of the sealing properties of the seal member.

According to the above configuration, when the annular portion is placed on the placement surface portion, the second downward extending portion faces the second sidewall portion on the other peripheral portion side of the placement surface portion. Accordingly, even if the annular portion is pulled toward the one peripheral portion side of the placement surface portion, the second downward extending portion is caught by the second sidewall portion on the other peripheral portion side of the placement surface portion. This reduces displacement of the annular portion with respect to the placement surface portion toward the one peripheral portion side, and thus restrains the annular portion from becoming out of alignment from the other peripheral portion side of the placement surface portion. As a result, satisfactory sealing properties of the seal member can be maintained.

In one embodiment, the seal member has a tab portion extending from a tip end of the first downward extending portion toward a side away from the one peripheral portion.

According to this configuration, the first engaging portion and the first engaged portion can be easily engaged with each other by pinching the tab portion.

According to the present disclosure, the seal member interposed between the flange portion and the vehicle body is restrained from coming off from the flange portion in the suspension mount without using an adhesive.

DETAILED DESCRIPTION

Hereinafter, an embodiment of the present disclosure will be described in detail with reference to the drawings. The following description of a preferred embodiment is illustrative in nature and is not intended in any way to limit the disclosure or its application or uses.

Figure 1:
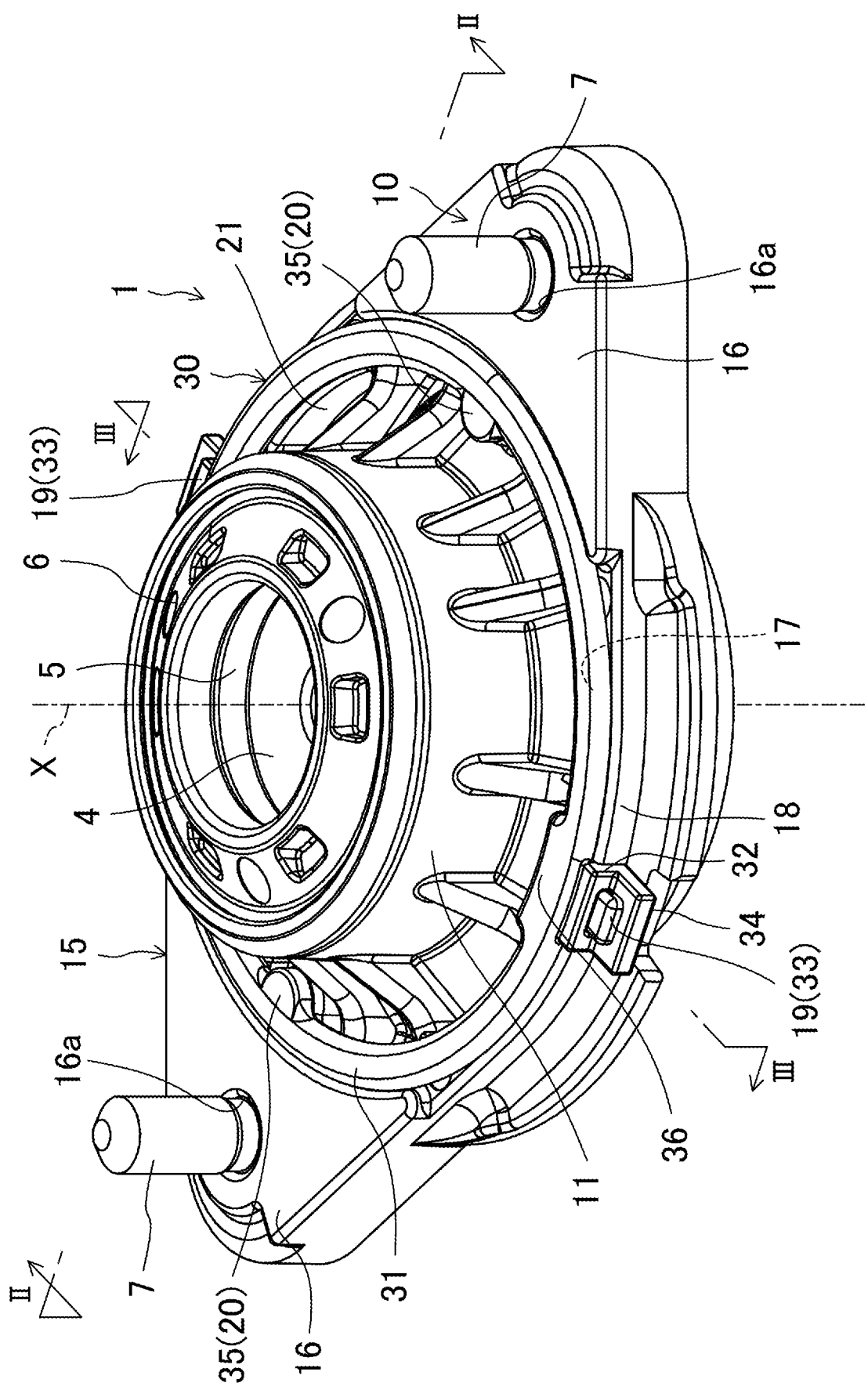
FIG. 1 is a perspective view of a strut mount according to an embodiment of the present disclosure.
Figure 2:
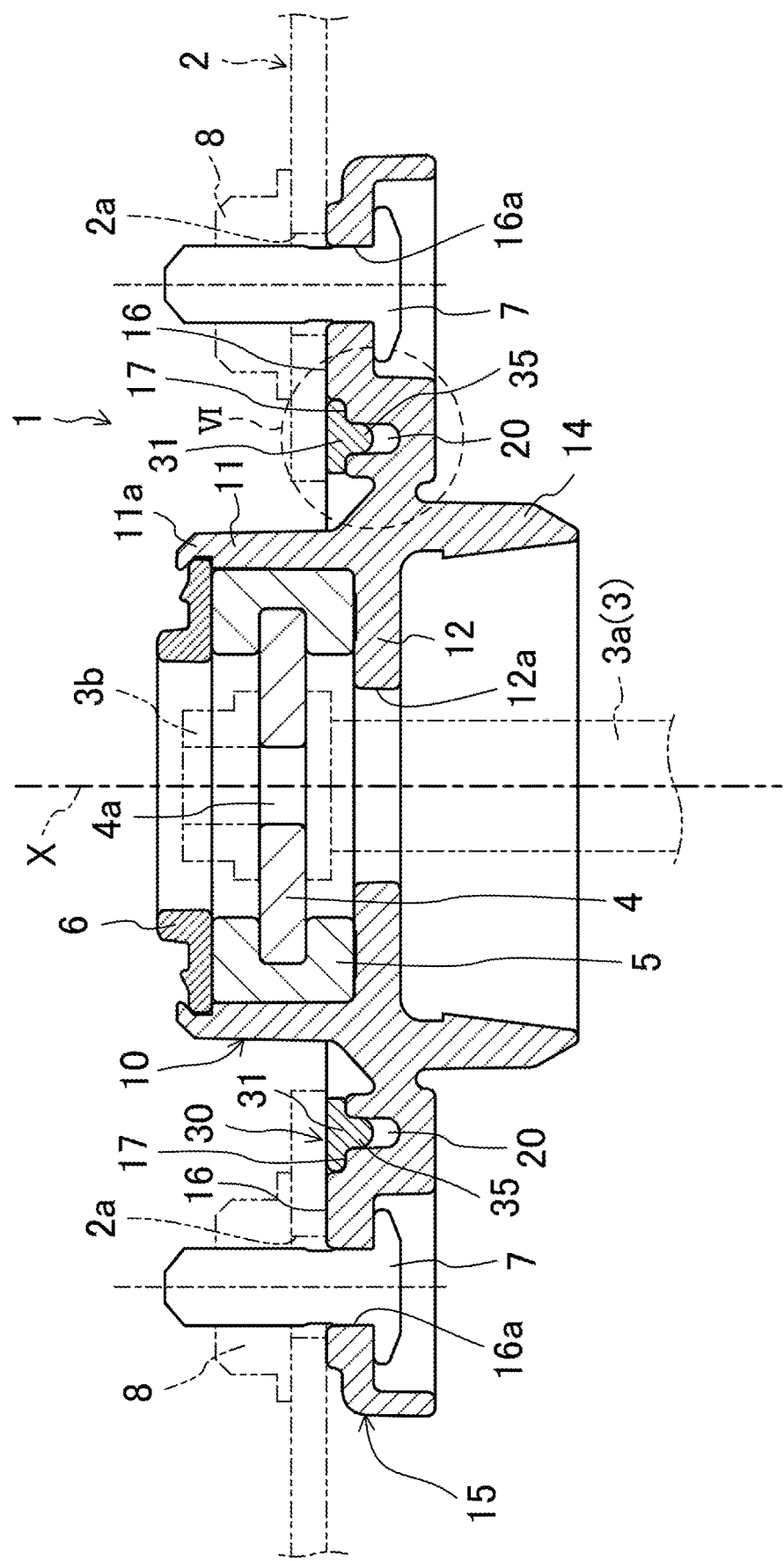
FIG. 2 is a sectional view of the strut mount taken along line II-II in FIG. 1.
Figure 3:
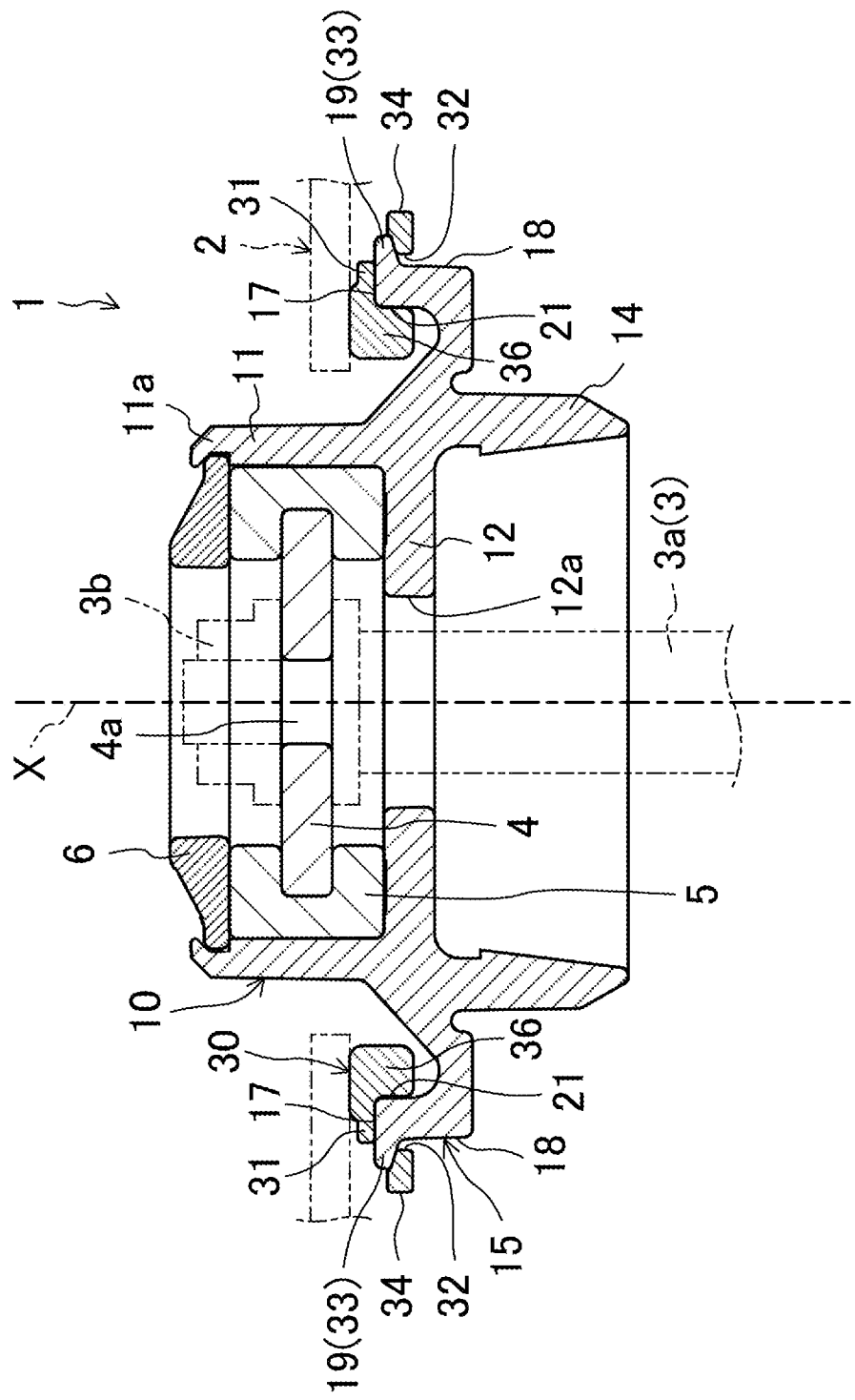
FIG. 3 is a sectional view of the strut mount taken along line in FIG. 1.

FIGS. 1 to 3 show an entire strut mount 1 that is a suspension mount according to an embodiment of the present disclosure. The strut mount 1 is interposed between a vehicle body panel 2 and a piston rod 3a of a shock absorber in a suspension 3 and reduces transmission of vibrations from the road surface to the vehicle body panel 2.

In the figures, X represents the central axis of the strut mount 1. In the following description, the axial direction of the central axis X, the radial direction of the central axis X, and the circumferential direction of the central axis X are simply referred to as the axial direction, the radial direction, and the circumferential direction, respectively. The upper side refers to the vehicle body panel 2 side in the axial direction, and the lower side refers to the opposite side in the axial direction from the vehicle body panel 2, namely the suspension side.

As shown in FIGS. 2 and 3, the strut mount 1 includes a circular annular inner member 4, an outer bracket 10, an elastic member 5, an upper member 6, and a seal member 30. The inner member 4 is made of metal. The outer bracket 10 is made of metal and surrounds the inner member 4. The elastic member 5 is located between the inner member 4 and the outer bracket 10. The upper member 6 is attached to the upper part of the outer bracket 10. The seal member 30 is located between the vehicle body panel 2 and the outer bracket 10.

The inner member 4 has a circular insertion hole 4a in its center. The upper end of the piston rod 3a (suspension 3) is fitted in and coupled to the insertion hole 4a. The inner member 4 is integral with the piston rod 3a. A nut 3b is screwed on the tip end of the piston rod 3a that is located above the inner member 4.

Figure 4:
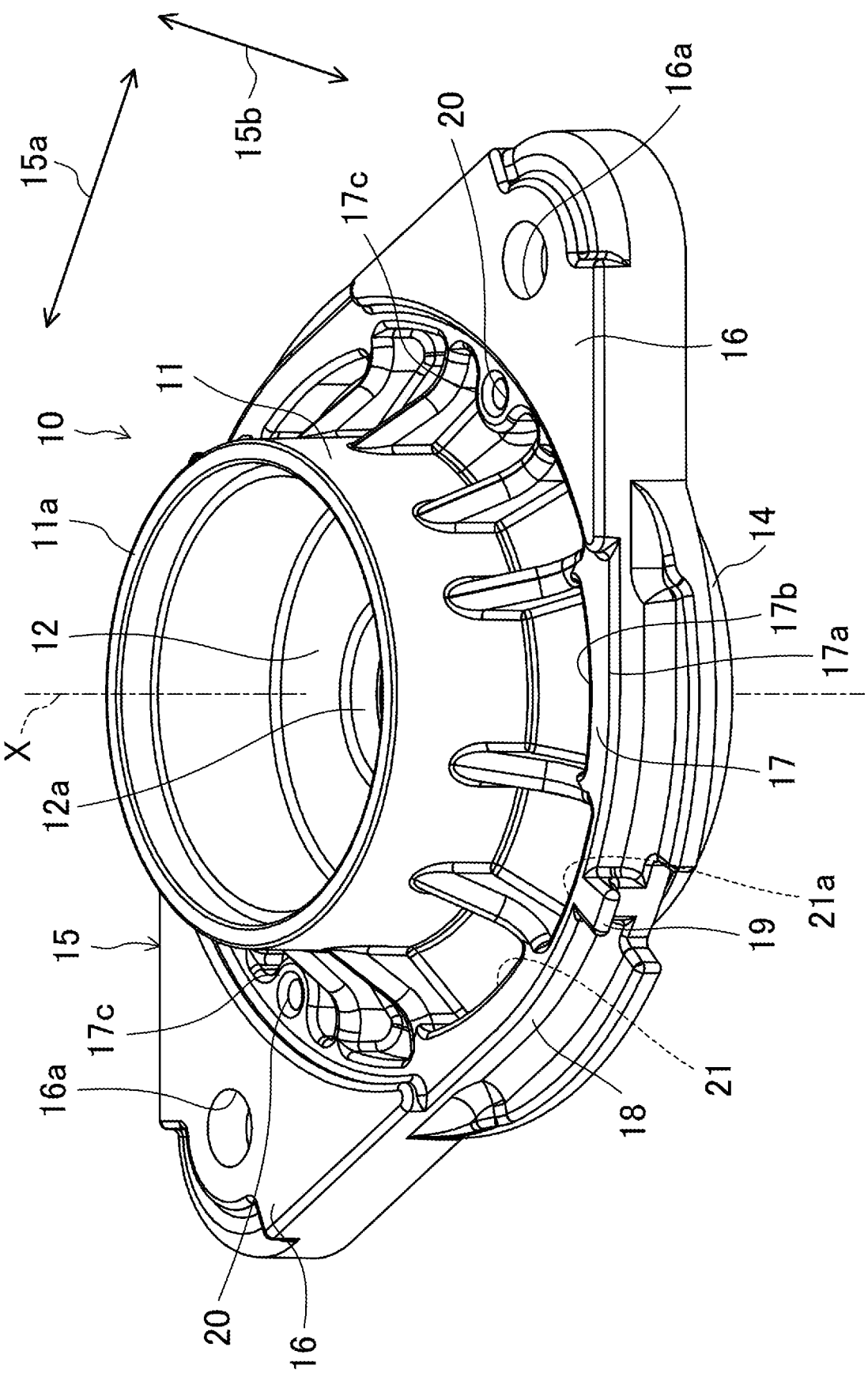
FIG. 4 is a perspective view of an outer bracket.

FIG. 4 shows the outer bracket 10 alone. As shown in FIGS. 2 and 3, the outer bracket 10 includes an outer cylinder portion 11, a circular annular bottom portion 12, a cylindrical holding cylinder portion 14, and a flange portion 15. The outer cylinder portion 11 houses the inner member 4 inside such that the central axis X of the outer cylinder portion 11 matches the central axis X of the inner member 4. The bottom portion 12 extends radially inward from the lower end of the outer cylinder portion 11. The holding cylinder portion 14 protrudes downward from the outer peripheral edge of the bottom portion 12. The flange portion 15 protrudes radially outward from the lower end of the outer cylinder portion 11 and is coupled to the vehicle body panel 2.

The outer cylinder portion 11 has a protruding portion 11a along the entire circumference of its upper end. The protruding portion 11a is bent inward at its tip end and has a generally L-shape in section. The upper member 6 is fixed to the upper end of the outer cylinder portion 11 by the protruding portion 11a by crimping. Before the upper member 6 is fixed to the upper end of the outer cylinder portion 11, the protruding portion 11a is not bent inward at its tip end but protrudes upward as shown in FIG. 4.

The bottom portion 12 has a circular opening 12a in its center. The piston rod 3a is inserted through the opening 12a.

The flange portion 15 will be described in detail later.

As shown in FIGS. 2 and 3, the elastic member 5 is interposed between the inner member 4 and the outer cylinder portion 11 of the outer bracket 10. Specifically, the elastic member 5 has a generally cylindrical shape so that the elastic member 5 covers the outer periphery of the inner member 4 along the entire circumference of the inner member 4 and that the elastic member 5 is surrounded by the outer cylinder portion 11 and the bottom portion 12 of the outer bracket 10.

The elastic member 5 is made of, e.g., urethane foam resin etc. The elastic member 5 is manufactured as a member integral with the inner member 4 by, e.g., insert molding. The elastic member 5 is sandwiched in a vertically compressed state between the upper member 6 and the bottom portion 12 of the outer bracket 10.

Figure 5:
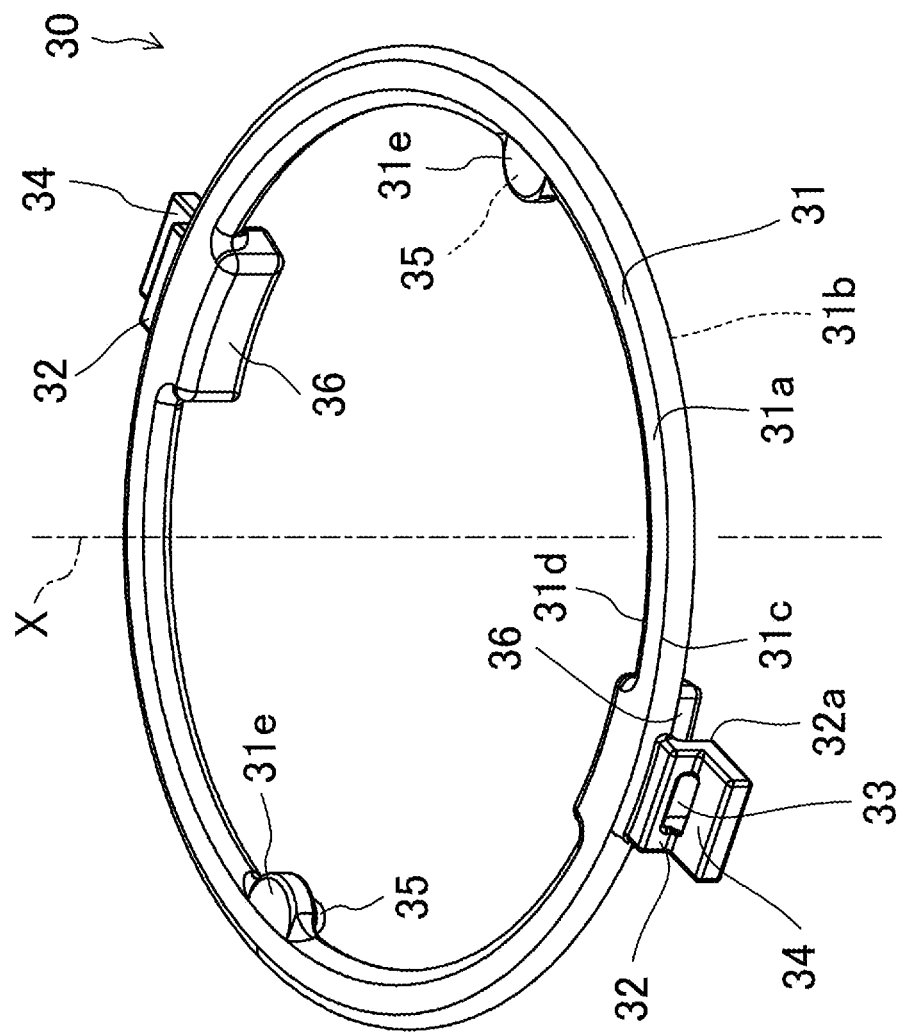
FIG. 5 is a perspective view of a seal member.

FIG. 5 shows the seal member 30 alone. As shown in FIGS. 2 and 3, the seal member 30 is interposed between the flange portion 15 and the vehicle body panel 2. The seal member 30 is attached to the flange portion 15. The seal member 30 seals the gap between the flange portion 15 and the vehicle body panel 2 and thus reduces the risk of water etc. entering the outer cylinder portion 11 through the gap between the flange portion 15 and the vehicle body panel 2 when it rains.

As shown in FIG. 5, the seal member 30 has an annular portion 31, first downward extending portions 32, first engaging portions 33, tab portions 34, second engaging portions 35, and second downward extending portions 36. For example, the seal member 30 is an O-ring made of rubber.

The annular portion 31 has, for example, a circular annular shape and is located between the flange portion 15 and the vehicle body panel 2. The annular portion 31 has an upper surface 31a on the vehicle body panel 2 side and a lower surface 31b on the opposite side from the vehicle body panel 2.

The first downward extending portions 32 extend downward from an outer peripheral portion (outer peripheral edge) 31c of the annular portion 31. A total of two first downward extending portions 32 are provided at an interval of 180° in the circumferential direction. For example, the first downward extending portions 32 are in the shape of a generally rectangular plate.

The first engaging portions 33 are provided in the first downward extending portions 32. The first engaging portions 33 are through holes extending through the first downward extending portions 32 in the thickness direction of the first downward extending portions 32.

The tab portions 34 extend from tip ends (lower ends) 32a of the first downward extending portions 32 toward the side away (radially outward) from the outer peripheral portion (one peripheral portion) 31c. The tab portions 34 are in the shape of a generally rectangular plate that is the same as the first downward extending portions 32, and are continuous with the tip ends 32a of the first downward extending portions 32.

The second engaging portions 35 are located on the lower surface 31b of the annular portion 31. The second engaging portions 35 are protrusions protruding downward. A total of two second engaging portions 35 are provided at an interval of 90° in the circumferential direction from the first downward extending portions 32 (first engaging portions 33). Specifically, the annular portion 31 has a pair of semicircular seat portions 31e provided at an interval of 90° in the circumferential direction from the first downward extending portions 32. The seat portions 31e protrude radially inward from an inner peripheral portion (inner peripheral edge) 31d of the annular portion 31. The second engaging portions 35 are provided on the seat portions 31e of the annular portion 31.

The second downward extending portions 36 extend downward from the inner peripheral portion 31d of the annular portion 31. A total of two second downward extending portions 36 are provided at the same positions in the circumferential direction as the first downward extending portions 32. That is, the second downward extending portions 36 are located on the opposite side in the radial direction of the annular portion 31 from the first downward extending portions 32, and face the first downward extending portions 32 in the radial direction with the annular portion 31 interposed therebetween. The second downward extending portions 36 are generally in the shape of a block (angular block) and are larger and heavier than the first downward extending portions 32.

The configuration of the flange portion 15 of the outer bracket 10 will be described in detail mainly with reference to FIG. 4. The overall shape of the flange portion 15 is a generally elliptical disc. In FIG. 4, 15a represents the major axis direction (longitudinal direction) of the flange portion 15, and 15b represents the minor axis direction (lateral direction) of the flange portion 15.

The flange portion 15 has a pair of joint surfaces 16 on its upper side. The joint surfaces 16 are located on both sides in the major axis direction 15a of the flange portion 15 and face toward the vehicle body panel 2. The joint surfaces 16 are joined to the vehicle body panel 2. The joint surfaces 16 have a tapered shape with its length in the minor axis direction 15b shorter on the outer side than on the inner side in the major axis direction 15a. Each joint surface 16 has a generally arc-shaped tip end. The flange portion 15 has bolt insertion holes 16a in the joint surfaces 16. There is no joint surface 16 on either side in the minor axis direction 15b of the flange portion 15.

As shown in FIGS. 2 and 3, with the joint surfaces 16 being joined to the vehicle body panel 2, shanks of bolts 7 are inserted through the bolt insertion holes 16a of the flange portion 15 and bolt insertion holes 2a of the vehicle body panel 2. The flange portion 15 is fastened to the vehicle body panel 2 by screwing nuts 8 on the tip end sides of the shanks.

The flange portion 15 has on its upper side a placement surface portion 17 facing toward the vehicle body panel 2. The placement surface portion 17 has a circular annular shape. The annular portion 31 of the seal member 30 is placed on the placement surface portion 17.

The placement surface portion 17 includes a placement surface (upper surface, front surface) facing toward the vehicle body panel 2, and inner and outer peripheral edge portions (ends, edges) of the placement surface.

The placement surface portion 17 is located inward of the joint surfaces 16 in the major axis direction 15a and outward of the outer cylinder portion 11 in the radial direction. The placement surface portion 17 connects to the joint surfaces 16 on its both sides in the major axis direction 15a. The placement surface portion 17 is located lower than the joint surfaces 16.

The flange portion 15 has a total of two first sidewall portions 18 on its upper side. The first sidewall portions 18 are located on both sides in the minor axis direction 15b of the flange portion 15. The first sidewall portions 18 extend downward from an outer peripheral portion (outer peripheral edge) 17a of the placement surface portion 17 so as to correspond to the first downward extending portions 32 of the seal member 30. The first sidewall portions 18 have an arc shape between the joint surfaces 16 in the circumferential direction.

Each first sidewall portion 18 has a first engaged portion 19. The first engaged portion 19 is a protrusion protruding outward in the radial direction, specifically outward in the minor axis direction 15b. There are a total of two first engaged portions 19.

Figure 6:
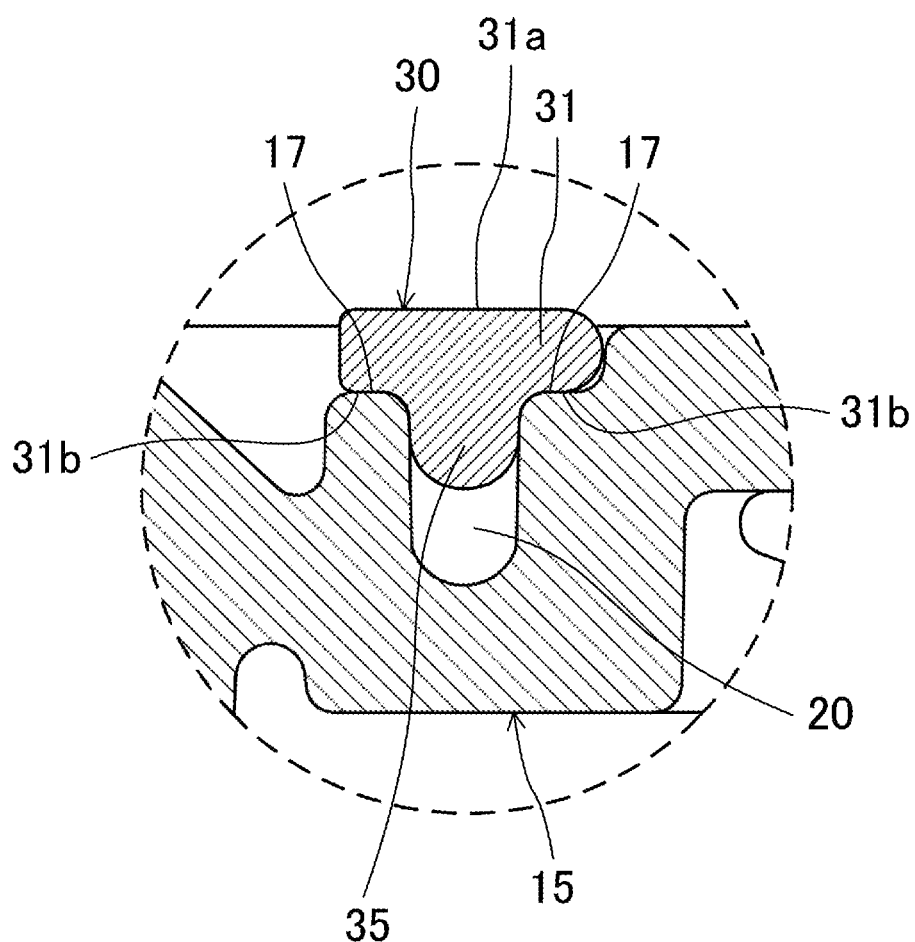
FIG. 6 is an enlarged view of a portion VI in FIG. 2.

The placement surface portion 17 has second engaged portions 20 corresponding to the second engaging portions 35 of the seal member 30. A total of two second engaged portions 20 are provided at an interval of 90° in the circumferential direction from the first engaged portions 19. As shown in FIG. 6, the second engaged portions 20 are non-through recesses. Specifically, the placement surface portion 17 has a pair of semicircular seat portions 17c. The seat portions 17c are provided at an interval of 90° in the circumferential direction from the first engaged portions 19 and protrude radially inward from an inner peripheral portion (inner peripheral edge) 17b of the placement surface portion 17. The second engaged portions 20 are formed in the seat portions 17c of the placement surface portion 17.

The flange portion 15 has a total of two second sidewall portions 21 on its upper side. The second sidewall portions 21 are located on both sides in the minor axis direction 15b of the flange portion 15. The second sidewall portions 21 extend downward from the inner peripheral portion 17b of the placement surface portion 17 so as to correspond to the second downward extending portions 36 of the seal member 30. The second sidewall portions 21 have an arc shape between the joint surfaces 16 in the circumferential direction.

The second sidewall portions 21 are located on the opposite side in the radial direction of the placement surface portion 17 from the first sidewall portions 18. Each second sidewall portion 21 has a housing recess 21a that is recessed radially outward so that the second downward extending portion 36 of the seal member 30 is fitted and housed in the housing recess 21a.

FIGS. 1 to 3 show the seal member 30 attached to the flange portion 15. The annular portion 31 is placed on the placement surface portion 17. The first downward extending portions 32 face the first sidewall portions 18. The first engaged portions 19 that are protrusions are fitted in and engaged with the first engaging portions 33 that are holes. The second engaging portions 35 that are protrusions are fitted in and engaged with the second engaged portions 20 that are recesses. The second downward extending portions 36 face the second sidewall portions 21.

As described above, according to the present embodiment, when the annular portion 31 of the seal member 30 is placed on the placement surface portion 17 of the flange portion 15, the first downward extending portion 32 extending from the outer peripheral portion 31c of the annular portion 31 toward the opposite side from the vehicle body panel 2 (downward) faces the first sidewall portion 18 extending from the outer peripheral portion 17a of the placement surface portion 17 toward the opposite side from the vehicle body panel 2 (downward).

In this state, the first engaging portion 33 of the first downward extending portion 32 and the first engaged portion 19 of the first sidewall portion 18 are engaged with each other. This engagement reduces movement of the annular portion 31 placed on the placement surface portion 17 at least in the axial direction.

This configuration restrains, without using an adhesive, the seal member 30 from separating and coming off from the flange portion 15 before the strut mount 1 is attached to the vehicle body panel 2.

The plurality of first downward extending portions 32 (first sidewall portions 18) is provided at an interval in the circumferential direction. Specifically, the two first downward extending portions (first sidewall portions 18) are provided at an interval of 180° in the circumferential direction. This reduces movement of the annular portion 31 placed on the placement surface portion 17 in the radial direction.

The structure is simple because the first engaging portion 33 that is a hole and the first engaged portion 19 that is a protrusion can be engaged with each other by merely fitting the first engaged portion 19 in the first engaging portion 33. This engagement structure reduces movement of the annular portion 31 placed on the placement surface portion 17 in the circumferential direction. It is not necessary to form holes or recesses in the outer bracket 10 in order to provide the first engaged portions 19. This is advantageous in terms of the strength of the outer bracket 10.

The second engaging portion 35 of the annular portion 31 that is a protrusion and the second engaged portion 20 of the placement surface portion 17 that is a recess are engaged with each other by fitting the second engaging portion 35 in the second engaged portion 20. This engagement restrains the annular portion 31 placed on the placement surface portion 17 from changing in shape in the radial direction or the circumferential direction. This engagement also restrains the annular portion 31 from separating from the placement surface portion 17.

When the annular portion 31 is placed on the placement surface portion 17, the first downward extending portion 32 may be pressed by the first sidewall portion 18 and the annular portion 31 may be pulled toward the outer peripheral portion 17a side of the placement surface portion 17. In this case, the annular portion 31 may be displaced with respect to the placement surface portion 17 toward the outer peripheral portion 17a side, and the annular portion 31 may become out of alignment from the inner peripheral portion 17b side of the placement surface portion 17. This is not preferable in terms of the sealing properties of the seal member 30.

According to the present embodiment, when the annular portion 31 is placed on the placement surface portion 17, the second downward extending portion 36 faces the second sidewall portion 21 on the inner peripheral portion 17b side of the placement surface portion 17. Accordingly, even if the annular portion 31 is pulled toward the outer peripheral portion 17a side of the placement surface portion 17, the second downward extending portion 36 is caught by the second sidewall portion 21 on the inner peripheral portion 17b side of the placement surface portion 17. This reduces displacement of the annular portion 31 with respect to the placement surface portion 17 toward the outer peripheral portion 17a side, and thus restrains the annular portion 31 from becoming out of alignment from the inner peripheral portion 17b side of the placement surface portion 17. As a result, satisfactory sealing properties of the seal member 30 can be maintained.

The second downward extending portion 36 and the second sidewall portion 21 are located on the opposite side in the radial direction of the annular portion 31 and the placement surface portion 17 from the first downward extending portion 32 and the first sidewall portion 18. The first downward extending portion 32 and the second downward extending portion 36 thus sandwich the first sidewall portion 18 and the second sidewall portion 21 from both sides in the radial direction. This configuration more suitably provides the above effects.

The second downward extending portion 36 on the inner peripheral portion 31d side of the annular portion 31 of the seal member 30 is heavier than the first downward extending portion 32 on the outer peripheral portion 31c side of the seal member 30. This configuration restrains the annular portion 31 from changing in shape toward the outer peripheral portion 31c side and therefore even more suitably provides the above effects.

Since the second downward extending portion 36 is fitted in the housing recess 21a of the second sidewall portion 21, the shape and position in the circumferential direction of the annular portion 31 are more likely to be stabilized.

The first engaging portion 33 can be easily engaged with the first engaged portion 19 by pinching the tab portion 34.

Especially when there are a plurality of first downward extending portions 32 and a plurality of first sidewall portions 18 as in the present embodiment, the two first engaging portions 33 can be engaged with the two first engaged portions 19 at the same time by pressing the two tab portions 34 simultaneously with the pads of thumbs of both hands. The engagement work can therefore be quickly and easily performed.

In the present embodiment, the first downward extending portion 32 and the first sidewall portion 18 are located on the outer peripheral portion 31c side of the annular portion 31 and the outer peripheral portion 17a side of the placement surface portion 17. This configuration provides a sufficient work space for engaging the first engaging portion 33 and the first engaged portion 19 as compared to the case where the first downward extending portion 32 and the first sidewall portion 18 are located on the inner peripheral portion 31d side of the annular portion 31 and the inner peripheral portion 17b side of the placement surface portion 17, that is, as compared to the case where the first downward extending portion 32 and the first sidewall portion 18 are located between the annular portion 31 and placement surface portion 17, and the outer cylinder portion 11.

Although the present disclosure is described above based on the suitable embodiment, it should be understood that the above description is not restrictive and various modifications can be made.

In the above embodiment, the inner member 4 has a circular annular shape. However, the shape of the inner member 4 is not limited to the circular annular shape. For example, the inner member 4 may have a cylindrical shape.

In the above embodiment, the first engaging portion 33 is a through hole extending through the first downward extending portion 32. However, the first engaging portion 33 is not limited to the through hole. The first engaging portion 33 may be a non-through recess formed in the surface of the first downward extending portion 32 that faces the first sidewall portion 18. The first engaging portion 33 need not necessarily be a hole or a recess, and the first engaged portion 19 need not necessarily be a protrusion. For example, the first engaging portion 33 may be a protrusion, and the first engaged portion 19 may be a hole or a recess. Alternatively, the first engaging portion 33 and the first engaged portion 19 may be hooks that can engage with each other.

In the above embodiment, the second engaged portion 20 is a non-trough recess formed in the placement surface portion 17. However, the second engaged portion 20 is not limited to the non-through recess. The second engaged portion 20 may be a through hole. The second engaging portion 35 may be a through hole or a recess, and the second engaged portion 20 may be a protrusion. The second engaging portion 35 and the second engaged portion 20 may be hooks that can engage with each other.

The first downward extending portion 32 need not necessarily extend straight downward from the annular portion 31. The first downward extending portion 32 may extend in an obliquely downward direction having a radial component or a circumferential component. The first downward extending portion 32 may extend in various paths in its intermediate part. For example, the first downward extending portion 32 may be bent downward after extending outward in the radial direction or toward one side in the circumferential direction from the annular portion 31, or may extend downward after being curved from the annular portion 31.

In the above embodiment, the first downward extending portion 32 and the first sidewall portion 18 are located on the outer peripheral portion 31c side of the annular portion 31 and the outer peripheral portion 17a side of the placement surface portion 17. However, the first downward extending portion 32 and the first sidewall portion 18 need not necessarily located on the outer peripheral portion 31c side of the annular portion 31 and the outer peripheral portion 17a side of the placement surface portion 17. The first downward extending portion 32 and the first sidewall portion 18 may be located on the inner peripheral portion 31d side of the annular portion 31 and the inner peripheral portion 17b side of the placement surface portion 17. Similarly, the second downward extending portion 36 and the second sidewall portion 21 may be located on the outer peripheral portion 31c side of the annular portion 31 and the outer peripheral portion 17a side of the placement surface portion 17.

In the above embodiment, the annular portion 31 (placement surface portion 17) has a circular annular shape. However, the shape of the annular portion 31 (placement surface portion 17) is not limited to the circular annular shape. For example, the annular portion 31 (placement surface portion 17) may have a polygonal annular shape such as triangular annular shape or quadrilateral annular shape, an elliptical annular shape, etc.

In the above embodiment, the strut mount that is used for a strut suspension is illustrated as the suspension mount. However, the suspension mount is not limited to the strut mount. For example, a mount that is used for a suspension such as double wishbone suspension, multilink suspension, or torsion beam suspension may be used as the suspension mount.

Since the present disclosure is applicable to suspension mounts, the present disclosure is very useful and is highly industrially applicable.

What is claimed is:

1. A suspension mount interposed between a vehicle body and a suspension, comprising:
    an inner member coupled to the suspension, the inner member being annular or cylindrical;
    an outer bracket having an outer cylinder portion and a flange portion, the outer cylinder portion housing the inner member inside, and the flange portion protruding radially outward from the outer cylinder portion and coupled to the vehicle body;
    an elastic member interposed between the inner member and the outer cylinder portion; and
    a seal member interposed between the flange portion and the vehicle body, wherein:
        the seal member includes:
            an annular portion located between the flange portion and the vehicle body; and
            a first downward extending portion extending downward from one peripheral portion of the annular portion toward an opposite side from the vehicle body, the one peripheral portion being either an outer peripheral portion or an inner peripheral portion; and
        the flange portion includes:
            a placement surface portion which faces toward the vehicle body and on which the annular portion is placed; and
            a first sidewall portion extending from the one peripheral portion of the placement surface portion toward the opposite side from the vehicle body so as to correspond to the first downward extending portion; and
        the first downward extending portion has a first engaging portion and the first sidewall portion has a first engaged portion, and the first engaging portion and the first engaged portion are engaged with each other to reduce movement of the annular portion placed on the placement surface portion at least in an axial direction, wherein:

the first engaging portion is a hole or a recess; and the first engaged portion is a protrusion.

2. The suspension mount of claim 1, wherein the annular portion has a second engaging portion, the placement surface portion has a second engaged portion corresponding to the second engaging portion, and the second engaging portion and the second engaged portion are engaged with each other.

3. The suspension mount of claim 1, wherein the seal member has a second downward extending portion extending downward from the other peripheral portion of the annular portion toward the opposite side from the vehicle body, the other peripheral portion being either the outer peripheral portion or the inner peripheral portion, whichever is not the one peripheral portion, and the flange portion includes a second sidewall portion extending from the other peripheral portion of the placement surface portion toward the opposite side from the vehicle body so as to correspond to the second downward extending portion.

4. The suspension mount of claim 1, wherein the seal member has a tab portion extending from a tip end of the first downward extending portion toward a side away from the one peripheral portion.

\* \* \* \* \*